United States Patent
Hsieh et al.

(10) Patent No.: US 6,880,947 B2
(45) Date of Patent: Apr. 19, 2005

(54) DIRECT-TYPE BACKLIGHT UNIT FOR FLAT PANEL LIQUID CRYSTAL DISPLAYS

(75) Inventors: Chin-Kun Hsieh, Hsin-Chu (TW); Chuan-Pei Yu, I-Lan Hsien (TW); Han-Chou Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 91 days.

(21) Appl. No.: 10/249,584

(22) Filed: Apr. 22, 2003

(65) Prior Publication Data

US 2004/0032725 A1 Feb. 19, 2004

(30) Foreign Application Priority Data

Aug. 16, 2002 (TW) .................................... 091118594 A

(51) Int. Cl.[7] .................................................. F21V 7/04
(52) U.S. Cl. .......................... 362/31; 362/561; 362/290; 362/339; 362/28; 362/97

(58) Field of Search .......................... 362/31, 561, 290, 362/339, 345, 294, 28, 297; 349/70, 67

(56) References Cited

U.S. PATENT DOCUMENTS 6,609,807 B2 * 8/2003 Torihara et al. .............. 362/31

* cited by examiner

*Primary Examiner*—Stephen Husar
*Assistant Examiner*—Anabel Ton
(74) *Attorney, Agent, or Firm*—Winston Hsu

(57) ABSTRACT

A direct-type backlight unit for a flat panel liquid crystal display includes at least one lamp installed in a housing, a diffusion plate installed above the lamp, a reflection plate having a reflection surface and a back surface installed under the lamp for reflecting light generated by the lamp from the reflection surface to the diffusion plate, and the reflection plate having at least one aperture thereon, and a heat dissipating plate combined with the back surface of the reflection plate.

19 Claims, 9 Drawing Sheets

DIRECT-TYPE BACKLIGHT UNIT FOR FLAT PANEL LIQUID CRYSTAL DISPLAYS

BACKGROUND OF INVENTION

1. Field of the Invention

The present invention relates to a backlight unit for flat panel displays, and more particularly, to a direct-type backlight unit having improved heat-dissipating ability for flat panel displays, thereby prolonging the life of the backlight unit.

2. Description of the Prior Art

Backlight units are known in the art. The backlight unit, which is a key element in the fabrication of liquid crystal displays, is widely used in digital cameras, PDAs, vehicle satellite navigation systems, computer monitors, flat panel TVs and so on. Typically, a backlight unit, which is generally installed underneath a display panel, comprises a light source (or multiple light sources) and a light diffusion means for providing users and consumers with diffused, ample, and comfortable backlighting. Light penetrates the overlying display panel and forms various images controlled by pixel electrodes densely arranged on the display panel. Backlight units are typically divided into two major categories: edge light type and direct-type, where the direct-type backlight unit can provide higher intensity of light and is thus more suited for large size display panels such as TV panels than the edge light type.

Referring to FIG. 1, a cross-sectional view of a conventional direct-type backlight unit 10 is illustrated. The backlight unit 10 is installed underneath a display panel 12 and comprises a diffusion plate 16, a reflection plate 18, and multiple light tubes 14 arranged in parallel in a chamber 30 defined by the diffusion plate 16 and the reflection plate 18. The reflection plate 18 is used to reflect light generated by the light tubes 14 upward to the overlying diffusion plate 16 thereby increasing light use efficiency of the backlight unit. The diffusion plate 16 is used to diffuse light (or reflected light) by means of shielding, scattering, or refraction. The diffusion plate 16 is typically made of acrylic or polycarbonate (PC) materials having a thickness of about 2 mm to 3 mm and a light transmission ratio of about 50% to 80%. According to a prior art method for generating diffused light, dispersed ink or light shielding tiny dots are printed onto a surface of the diffusion plate 16. Above the diffusion plate 16, a diffusing sheet 20 and an optic focusing film 22 are typically provided for enhancing backlighting. The diffusing sheet 20 (also referred to as a protection diffusing sheet) is made of PET or PC and has a higher light transmission ratio than that of the underlying diffusion plate 16, a lower haze, and a thickness of about 0.11 mm to 0.15 mm.

However, the above-mentioned prior art direct-type backlight unit suffers from heat radiation problems. In a practical case, heat accumulated in the chamber 30 reduces lifetime of the light tubes 14 and the high temperature on the diffusion plate 16 causes distortion of the optic focusing film 22, that, in turn, leads to poor light output performance. An approach to solving this heat buildup problem is using a heat-radiating fan installed at a periphery of the backlight module. Nevertheless, this introduces undesirable dust into the backlight unit casing and also consumes electricity. Consequently, there is a strong need to provide an improved direct-type backlight unit to elongate lifetime of light tubes, and, at the same time, thin down the backlight unit.

SUMMARY OF INVENTION

Accordingly, one object of the present invention is to provide an improved direct-type backlight unit to solve the above-mentioned problems.

According to the present invention, a direct-type backlight unit for a flat panel liquid crystal display comprises at least one lamp installed in a housing, a diffusion plate installed above the lamp, a reflection plate having a reflection surface and a back surface installed under the lamp for reflecting light generated by the lamp from the reflection surface to the diffusion plate, and the reflection plate having at least one aperture thereon, and a heat dissipating plate combined with the back surface of the reflection plate.

Other objects, advantages, and novel features of the present invention will be more clearly and readily apparent from the following detailed description when taken in conjunction with the accompanying drawings.

DETAILED DESCRIPTION

Figure 1:
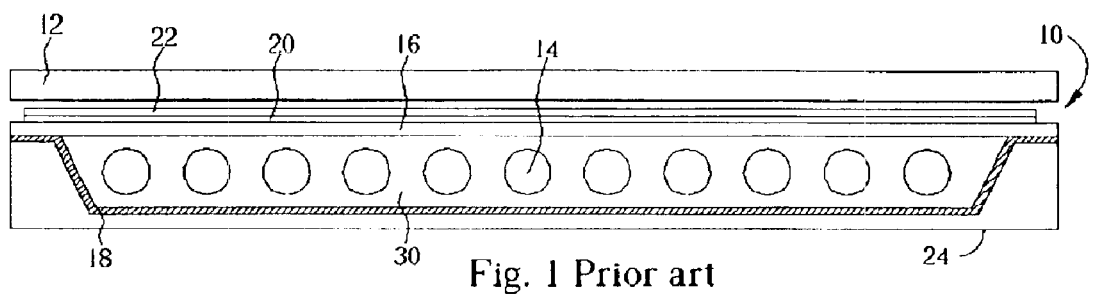
FIG. 1 is a cross-sectional view of a conventional direct-type backlight unit.
Figure 2:
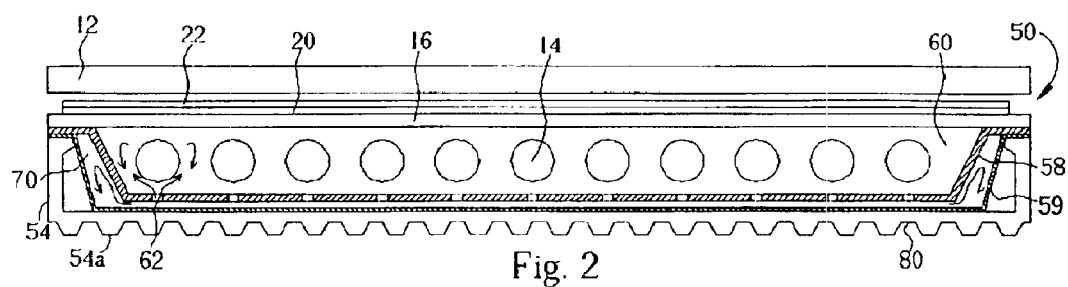
FIG. 2 is a cross-sectional, schematic diagram illustrating a direct-type backlight unit according to the present invention.

FIG. 2 is a cross-sectional schematic diagram illustrating a direct-type backlight unit 50 according to a first preferred embodiment of the present invention. As shown in FIG. 2, the backlight unit 50 is located underneath a display panel 12. The backlight unit 50 comprises a diffusion film 16, a reflection plate 58, and a plurality of lamps 14. The lamps 14 may be cold cathode fluorescent lamps (CCFL) arranged in a first chamber 60 defined by the diffusion film 16 and the reflection plate 58. The reflection plate 58 has a horizontal bottom surface and an inclined side surface and may be made of metals such as aluminum, alloys, foamed PET film, or PC resins. The diffusion film 16, reflection plate 58, and the lamps 14 are fixed on a housing 54 to ensure that dust is kept outside from entering the backlight unit 50. Above the diffusion plate 16, a diffusing sheet 20 and an optic focusing film 22 are optionally installed thereon for enhancing backlighting. It is understood that the number of the diffusing sheet 20 and the number of the optic focusing film 22 and arranging sequence of the two can be adjusted according to desired purposes. A heat-dissipating plate 59 is interposed between the reflection plate 58 and the housing 54 and defines a second chamber 70 with the reflection plate 58.

The heat-dissipating plate 59 is preferably made of materials having high thermal conductivity, for example, metals or alloys such as aluminum, copper, magnesium, titanium, or silver, or polymer composite materials. According to the first preferred embodiment of the present invention, the heat-dissipating plate 59 is attached onto an interior surface of the housing 54. On the outer surface 80 of the housing 54, a plurality of fin structures 54a are provided for increasing heat radiation area and heat transfer efficiency. The reflection plate 58 has a plurality of convection holes 62 formed thereon, which, as specifically indicated in FIG. 2, are preferably arranged directly under the lamps 14. By doing this, heat generated by the lamps 14 during operation can be transferred to the second chamber 70 from the first chamber 60 through the convection holes 62. The heat transferred to the second chamber 70 is then transferred to the heat-dissipating plate 59, such that the lamps 14 in the first chamber 60 can be operated substantially in an equi-temperature environment, thereby prolonging the lifetime of lamps 14. The dimension and the shape of the convection holes 62 can be changed according to desired purposes and should not limit the present invention thereto. The distance between the reflection plate 58 and the underlying heat-dissipating plate 59 may be in a range from few millimeters to several centimeters. In another embodiment of the present invention, the heat-dissipating plate 59 is attached to the reflection plate 58.

Figure 3:
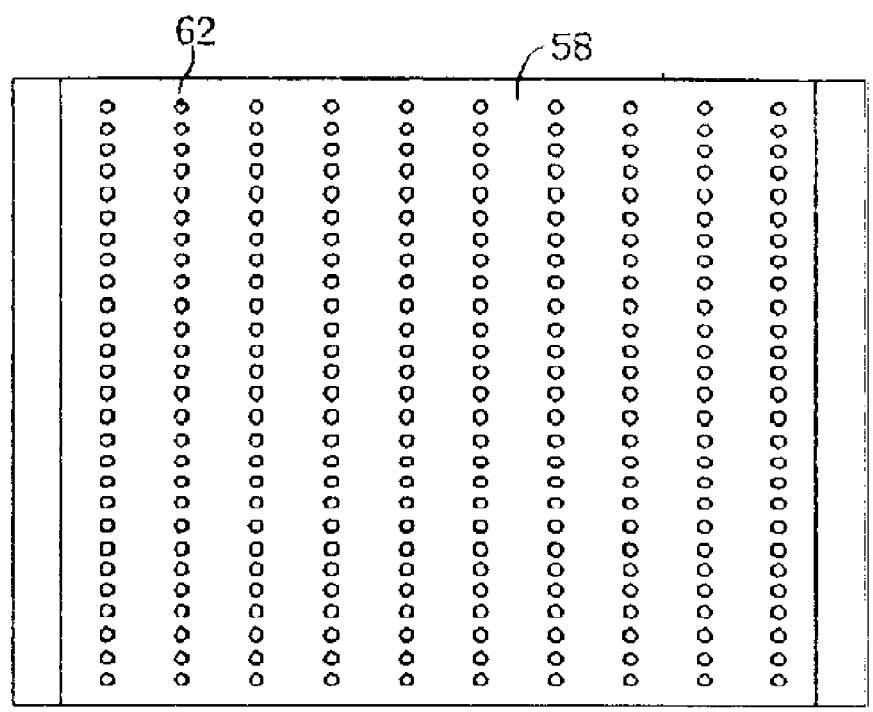
FIG. 3 is a top view of a reflection plate according to the present invention.
Figure 4:
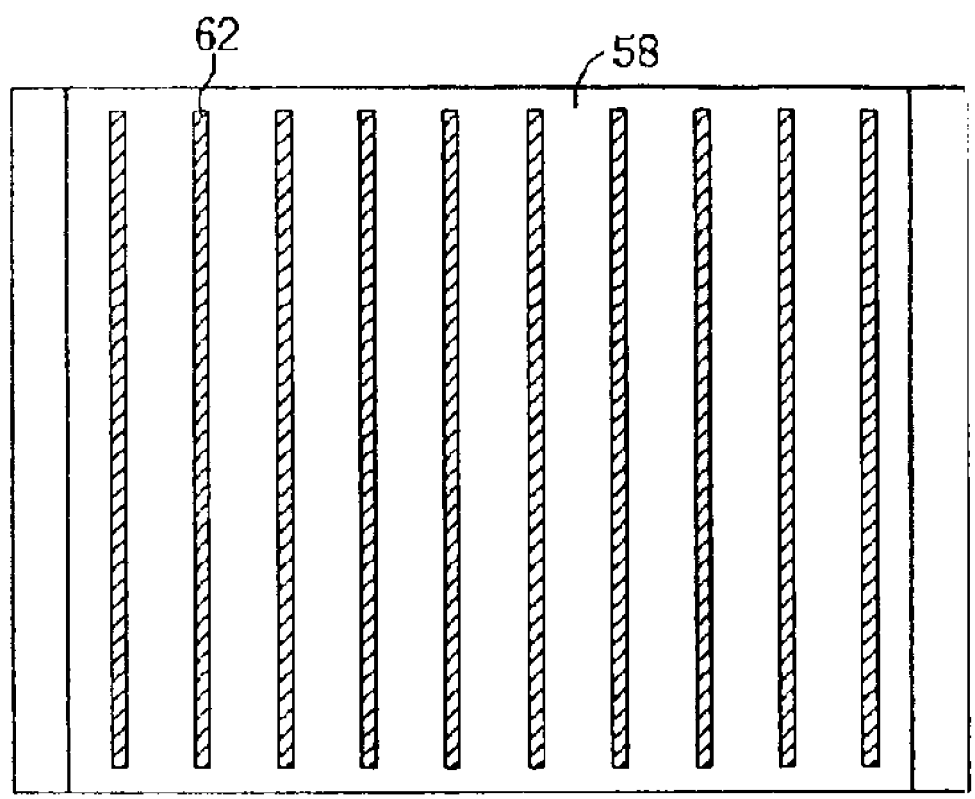
FIG. 4 is another example of the reflection plate according to the present invention.

FIG. 3 is a top view of the reflection plate 58 of FIG. 2. As shown in FIG. 3, the reflection plate 58 has columns of convection holes 62 arranged along the length of each of the lamps 14. The diameter of the convection holes 62 is preferably smaller than the radius of the lamps 14 to minimize light leakage. In a case that the heat-dissipating plate 59 installed under the reflection plate 58 is made of metals, some light passing through the convection holes 62 may be reflected back to the first chamber 60 so as to increase light use efficiency. Further, the convection holes 62 may be tapered holes having a larger diameter facing the first chamber 60 and a smaller diameter facing the second chamber 70. With the tapered convection holes, the total reflection area across the reflection plate 58 is increased. Referring now to FIG. 4, another example of the reflection plate 58 according to the present invention is illustrated in top view way. The convection holes 62 may be through slots, each of which having a width that is smaller than the radius of the lamps 14. The through slots may have inclined sidewalls for increasing light reflection area.

Figure 5:
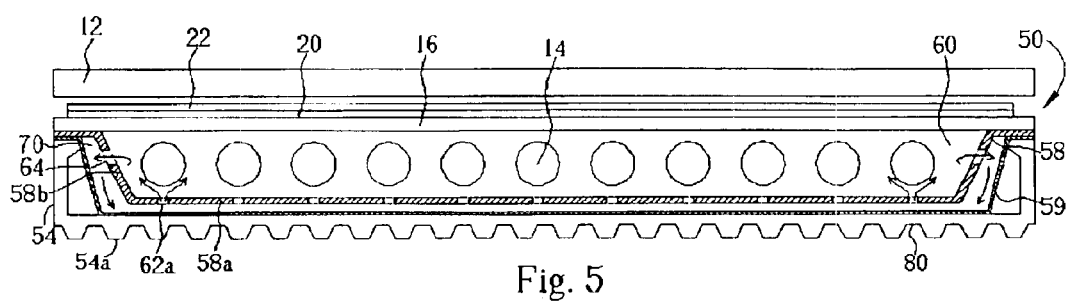
FIG. 5 is a cross-sectional schematic diagram of the backlight unit according to another preferred embodiment of the present invention.

FIG. 5 is a cross-sectional schematic diagram of the backlight unit 50 according to another preferred embodiment of the present invention. As shown in FIG. 5, the backlight unit 50 is located underneath a display panel 12. The backlight unit 50 comprises a diffusion film 16, a reflection plate 58, and a plurality of lamps 14. The lamps 14 are arranged in a first chamber 60 defined by the diffusion film 16 and the reflection plate 58. The reflection plate 58 has a horizontal bottom surface 58a and an inclined side surface 58b and may be made of metals such as aluminum, alloys, foamed PET film, or PC resins. The diffusion film 16, reflection plate 58, and the lamps 14 are fixed on a housing 54 to ensure that dust is kept from entering the backlight unit 50. Above the diffusion plate 16, a diffusing sheet 20 and an optic focusing film 22 are optionally installed thereon for enhancing backlighting. A heat-dissipating plate 59 is interposed between the reflection plate 58 and the housing 54 and defines a second chamber 70 with the reflection plate 58.

Likewise, the heat-dissipating plate 59 is preferably made of materials having high thermal conductivity, for example, metals or alloys such as aluminum, copper, magnesium, titanium, or silver, or polymer composite materials. The heat-dissipating plate 59 is attached onto an interior surface of the housing 54. On the outer surface 80 of the housing 54, a plurality of fin structures 54a are provided for increasing heat radiation area and heat transfer efficiency. The reflection plate 58 has a plurality of first convection holes 62a formed on the horizontal bottom surface 58a and a plurality of second convection holes 64 formed on the inclined side surface 58b. The first convection holes 62a are preferably arranged directly under the lamps 14. Heat generated by the lamps 14 during operation can be transferred to the second chamber 70 from the first chamber 60 through the first convection holes 62a. The heat transferred to the second chamber 70 is then transferred to the heat-dissipating plate 59, such that the lamps 14 in the first chamber 60 can be operated substantially in an equi-temperature environment, thereby prolonging the lifetime of lamps 14. The second convection holes 64 can provide an extra convection path for the air in the chambers 60 and 70. The dimension and the shape of the first convection holes 62a and second convection holes 64 can be changed according to desired purposes and should not limit the present invention thereto. The distance between the reflection plate 58 and the underlying heat-dissipating plate 59 may be in a range from few millimeters to several centimeters.

Figure 6:
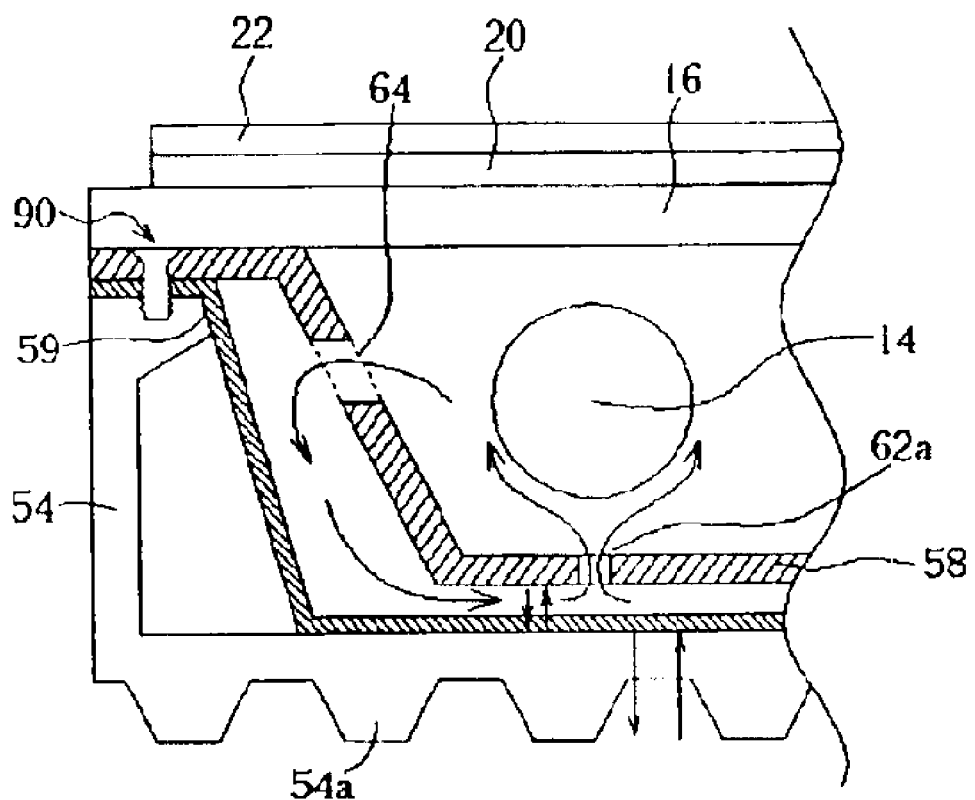
FIG. 6 is an enlarged view partially showing the cross section of the backlight unit of FIG. 5.

FIG. 6 is an enlarged view partially showing the cross section of the backlight unit 50 of FIG. 5. As shown in FIG. 6, heat generated by the lamps 14 is brought to the second chamber 70 from the first chamber 60 through the second convection holes 64 and the first convection holes 62a, and then heat is exchanged with the heat-dissipating plate 59 and the housing 54. Consequently, it is advantageous to use the present invention since the heat-dissipating ability is improved and thus the lifetime of the lamps 14 can be elongated. According to the preferred embodiment of the present invention, the reflection plate 58 and the heat-dissipating plate 59 are fastened on the housing 54 with screws 90 or the like. It is understood that contact area between the reflection plate 58 and the underlying heat-dissipating plate 59 may be increased so that heat transfer may be conducted by means of conduction in addition to convection.

Figure 7:
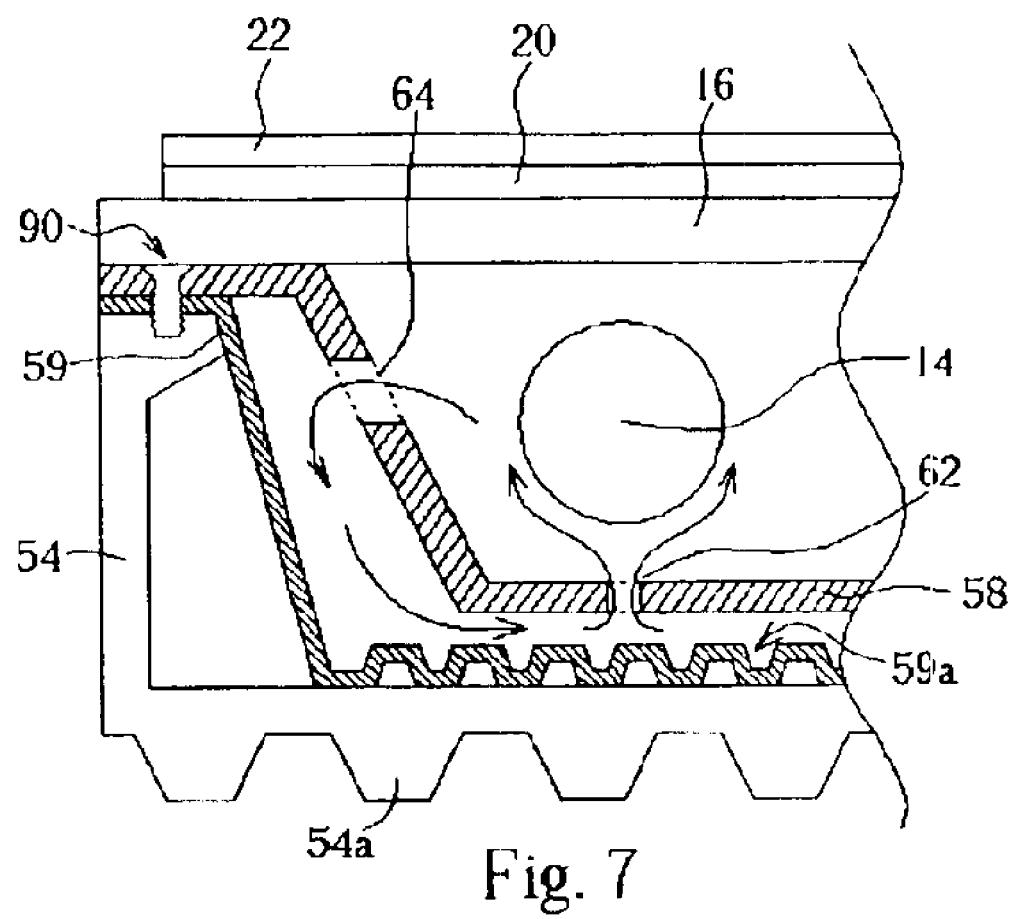
FIG. 7 is an enlarged view partially showing the cross section of another preferred example of the present invention.

FIG. 7 is an enlarged view partially showing the cross section of another preferred embodiment of the present invention. As shown in FIG. 7, the bottom of the heat-dissipating plate 59 may be puckered to form wave structures 59a, so as to increase heat exchange area.

Figure 8:
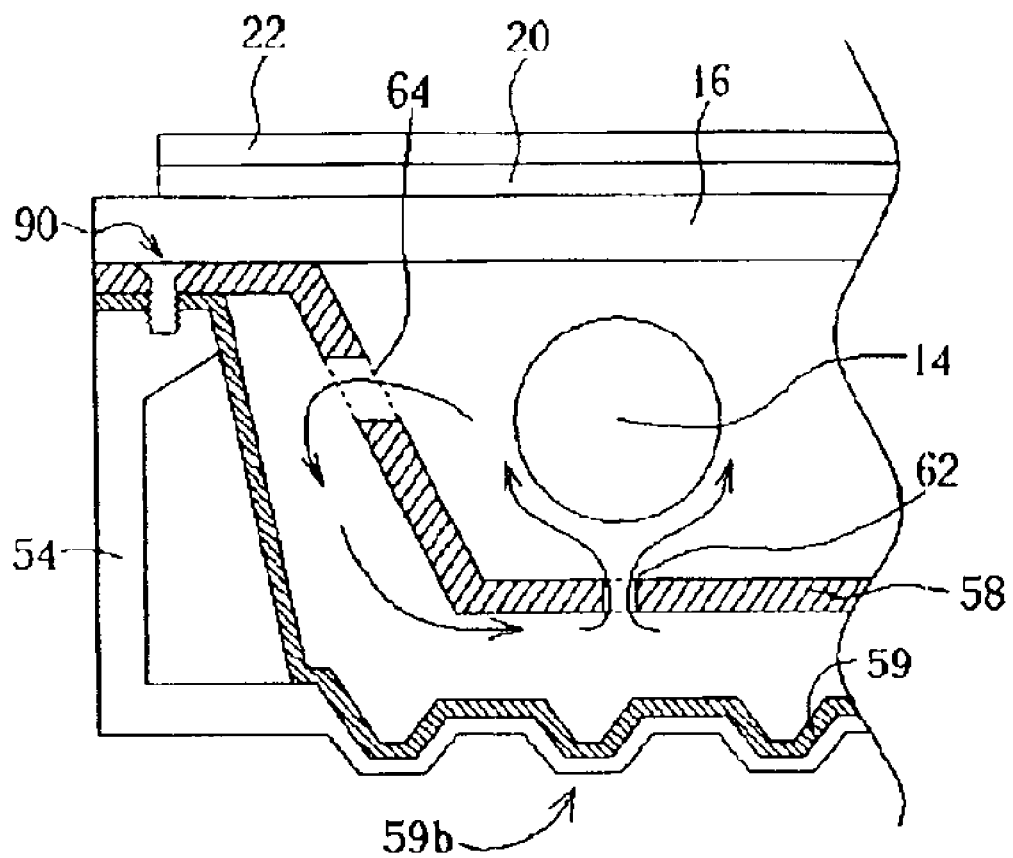
FIG. 8 is an enlarged view partially showing the cross section of another preferred embodiment of the present invention.

FIG. 8 is an enlarged view partially showing the cross section of another preferred example of the present invention. As shown in FIG. 8, the bottom of the heat-dissipating plate 59 is attached to the housing 54 and pressed into fin structures 59b.

Figure 9:
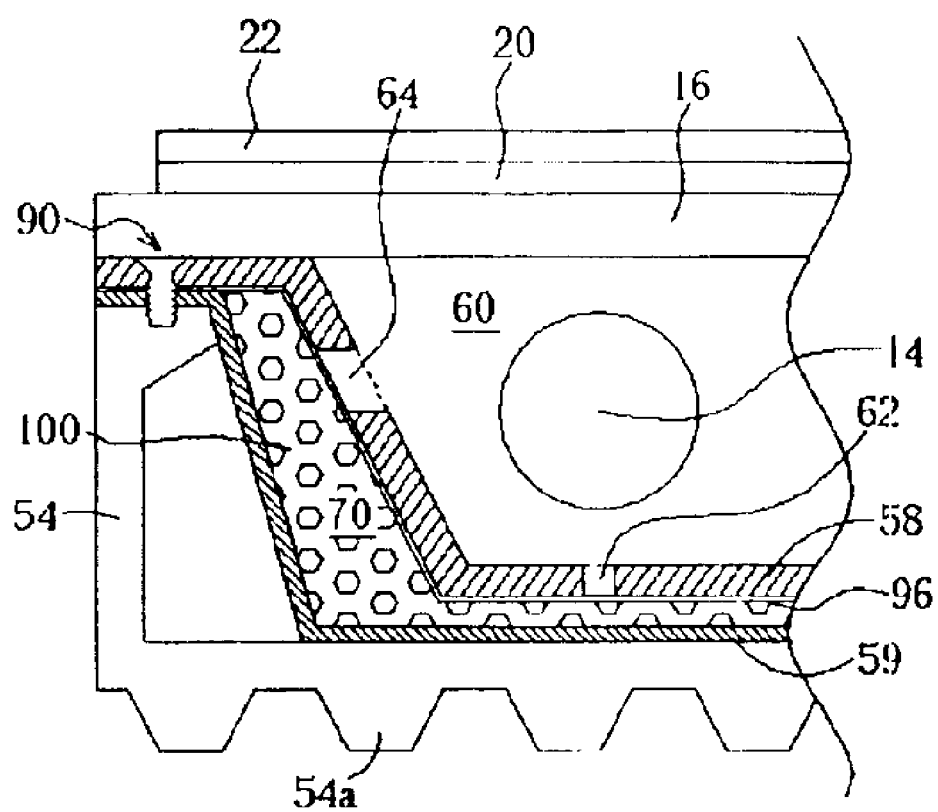
FIG. 9 is an enlarged view of the backlight unit according to another preferred embodiment of the present invention.

FIG. 9 is an enlarged view of the backlight unit 50 according to another preferred embodiment of the present invention. As shown in FIG. 9, the backlight unit 50 comprises a diffusion film 16, a reflection plate 58, and a plurality of lamps 14. The lamps 14 are arranged in a first chamber 60 defined by the diffusion film 16 and the reflection plate 58. The reflection plate 58 has a horizontal bottom surface 58a and an inclined side surface 58b and may be made of metals such as aluminum, alloys, foamed PET film, or PC resins. The diffusion film 16, reflection plate 58, and the lamps 14 are fixed on a housing 54 to ensure that dust is kept outside from entering the backlight unit 50. Above the diffusion plate 16, a diffusing sheet 20 and an optic focusing film 22 are optionally installed thereon for enhancing backlighting. A heat-dissipating plate 59 is interposed between the reflection plate 58 and the housing 54 and defines a second chamber 70 with the reflection plate 58. A thin film such as a PE film is attached to the bottom of the reflection plate 58 to seal the second chamber 70. The sealed second chamber may be filled with heat dissipating materials 70 having high thermal conductivity either in liquid or solid phases.

The heat-dissipating plate 59 is preferably made of materials having high thermal conductivity, for example, metals or alloys such as aluminum, copper, magnesium, titanium, or silver, or polymer composite materials. The heat-dissipating plate 59 is attached onto an interior surface of the housing 54. On the outer surface 80 of the housing 54, a plurality of fin structures 54a are provided for increasing heat radiation area and heat transfer efficiency. The reflection plate 58 has a plurality of first convection holes 62a formed on the horizontal bottom surface 58a and a plurality of second convection holes 64 formed on the inclined side surface 58b. The first convection holes 62a are preferably arranged directly under the lamps 14. Heat generated by the lamps 14 during operation can be transferred to the heat-dissipating materials 70 within second chamber 70 from the first chamber 60 through the first convection holes 62a and second convection holes 64. The heat transferred to the second chamber 70 is then transferred to the heat-dissipating plate 59, such that the lamps 14 in the first chamber 60 can be operated substantially in an equi-temperature environment, thereby prolonging the lifetime of lamps 14.

In contrast to the prior art backlight unit, it is advantageous to use the present invention because the lifetime of CCFL lamps can be elongated due to the significant improvement of heat dissipation. Further, with the use of tapered convection holes and the metallic heat-dissipating plate, light use efficiency and brightness of the backlight unit are not affected.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A direct-type backlight unit for a flat panel liquid crystal display, comprising:
   at least one lamp installed in a housing;
   a diffusion plate installed above the lamp;
   a reflection plate having a reflection surface and a back surface installed under the lamp for reflecting light generated by the lamp from the reflection surface to the diffusion plate, and the reflection plate having at least one aperture thereon; and
   a heat dissipating plate combined with the back surface of the reflection plate.

2. The direct-type backlight unit of claim 1, wherein the lamp is a cold cathode fluorescent lamp (CCFL).

3. The direct-type backlight unit of claim 1, wherein the aperture is located directly below the lamp.

4. The direct-type backlight unit of claim 1, wherein the aperture is a through slot corresponding to the length of the lamp.

5. The direct-type backlight unit of claim 4, wherein the lamp is a cylindrical fluorescent lamp and the through slot has a slot width that is less than half of the diameter of the lamp.

6. The direct-type backlight unit of claim 1, wherein the heat dissipating plate and the back surface of the reflection plate define a chamber communicating the aperture.

7. The direct-type backlight unit of claim 1, wherein the heat dissipating plate is attached to the back surface of the reflection plate.

8. The direct-type backlight unit of claim 1, wherein the heat dissipating plate is combined with the housing and are together pressed into a fin type heat dissipating structure.

9. The direct-type backlight unit of claim 1, wherein the heat dissipating plate is attached to an inner surface of the housing and on an outer surface of the housing there is provided a fin-type heat dissipating film.

10. The direct-type backlight unit of claim 1, wherein the heat dissipating plate is made of copper or aluminum.

11. A direct-type backlight unit for a flat panel liquid crystal display, comprising:
    a diffusion plate;
    a reflection plate having a bottom surface and inclined side surface, a first convection opening being formed at the bottom surface, and the reflection plate and the diffusion plate defining a first chamber;
    at least one lamp installed within the first chamber directly above the first convection opening; and
    at least one heat dissipating plate, the heat dissipating plate and the reflection plate defining a second chamber communicating the first convection opening, such that heat generated by the lamp can be transferred to the heat dissipating plate by means of convection occurred in the first chamber and second chamber thereby elongating lifetime of the lamp.

12. The direct-type backlight unit of claim 11, wherein a second convection opening is formed on the inclined side surface of the reflection plate and the second convection opening communicates with the second chamber.

13. The direct-type backlight unit of claim 11, wherein the lamp is a cylindrical cold cathode fluorescent lamp (CCFL).

14. The direct-type backlight unit of claim 11, wherein the first convection opening is a through slot laid on the reflection plate corresponding the length of the lamp.

15. The direct-type backlight unit of claim 14, wherein the through slot has a slot width less than half of the diameter of the lamp.

16. The direct-type backlight unit of claim 11, wherein the heat dissipating plate is combined with a housing and are together pressed into a fin type heat dissipating structure.

17. The direct-type backlight unit of claim 16, wherein the heat dissipating plate is attached to an inner surface of the housing and on an outer surface of the housing there is provided a fin-type heat dissipating film.

18. The direct-type backlight unit of claim 11, wherein the heat dissipating plate is made of copper or aluminum.

19. The direct-type backlight unit of claim 11, further comprising a sealing film blocking the first convection opening and sealing the second chamber which is substantially filled with liquid or solid heat conducting material.

* * * * *